United States Patent Office 3,445,560
Patented May 20, 1969

3,445,560
METHOD FOR MAKING SPIRAL-SHAPED
CONTINUOUS ROWS OF SLIDE FASTENER
ELEMENTS
Arthur Steingruebner, Am Buchenhang 11,
Bonn, Germany
Filed June 3, 1966, Ser. No. 555,172
Claims priority, application Germany, June 4, 1965,
S 97,467
Int. Cl. B21d 53/50
U.S. Cl. 264—281          4 Claims

ABSTRACT OF THE DISCLOSURE

Plastic wire is pushed into the winding zone of a coil-winding machine at such a high rate that the turns of the coil formed in the zone have an internal circumference which is at least twice the circumference of the mandrel on which the wire is being wound. The loose turns are moved axially along the mandrel, heated for stress relief, and compressed locally while hot to form interlocking heads and other functional elements.

---

This invention relates to slide fasteners whose elements are constituted by the turns of a deformed spiral of plastic wire, and particularly to a method for making spiral-shaped continuous rows of slide fastener elements.

It is known to wind plastic wire, that is, round or otherwise uniformly profiled, continuous, elongated strands of a thermoplastic material mainly consisting of synthetic organic polymers into spirals, and to deform the turns of the spiral until they constitute the elements of a slide fastener which may be interlocked with each other, usually similar or identical elements. The plastic wires, and particularly the spirals made from plastic wires, have relatively low moduli of elasticity in tension so that the spirals are wound in known processes at relatively low speeds because the wire tension or spiral tension increases with processing speed and causes deformation of the fastener elements. All known spiral winding devices rely on brakes, guides and other devices which frictionally engage the moving wire, or otherwise stress the wires in tension during spiral winding.

A significant source of wire tension in the known devices are the rotary supply reels from which the wires are drawn. The reels must be relatively small to avoid inertial and/or centrifugal forces which would cause tension in the wire.

An object of the invention is the provision of a method in which spirals for slide fastener elements are wound from plastic wire without tension in the wire and in the spirals wound therefrom practically independently of the winding speed.

Another object is a method in which the ultimate shape of the interlocking elements is entirely independent of the size and weight of the supply reels from which the plastic wire is drawn so that large and heavy supply reels initially holding large amounts of wire may be employed for long, uninterrupted manufacturing runs.

With these and other objects in view, as will hereinafter become apparent, the invention, in one of its aspects, resides in a method of making a continuous row of slide fastener elements in which a resilient thermoplastic wire is longitudinally fed to a winding zone at a certain feeding rate. The wire is wound about the axis of a mandrel at such a winding rate that the turns of the wound wire have an internal circumference which is at least twice the outer circumference of the mandrel. The wire turns are moved axially along the mandrel and are heated outside the winding zone above their softening temperature for a period sufficient to release the internal winding stresses. The heated turns are then laterally compressed to give them the desired shape. The wire may be compressed cyclically in a transverse direction while being fed to the winding mandrel to form a locking head on each turn.

When two wires are simultaneously fed, wound, and shaped in the manner outlined above, they may be cooled below their softening temperature, and the two rows of fastener elements so produced may be pulled up with each other.

Other features, additional objects, and many of the attendant advantages of this invention will be readily appreciated as the same becomes better understood by reference to the following detailed description of preferred embodiments when considered with the appended drawings in which.

Figure 1:
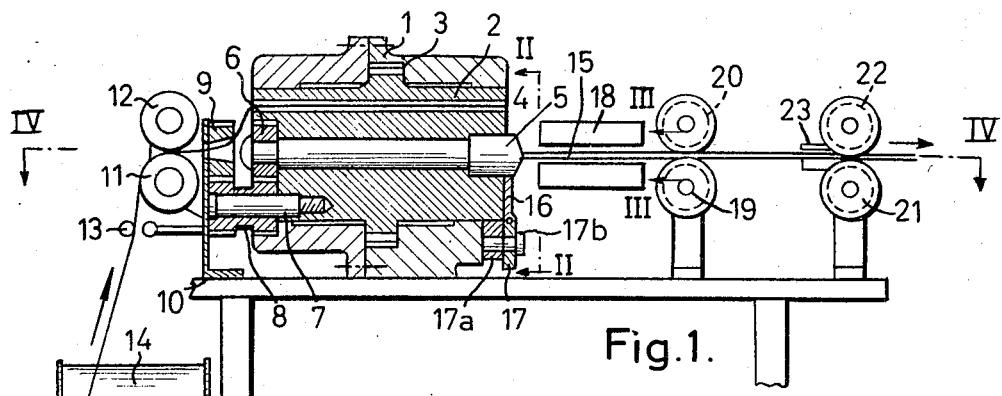
FIG. 1 shows an apparatus for performing the method of the invention in side-elevational section on the line I—I in FIG. 4.

Referring now to the drawing in detail and initially to FIG. 1, there is seen one of the winding mechanisms of a slide fastener making machine. As is evident from FIG. 4 the machine is equipped with two winding mechanisms which are mirror images of each other and operate in the same manner. The following description of the mechanism seen in FIG. 1 will therefore be understood to be largely applicable to both mechanisms.

Figure 4:
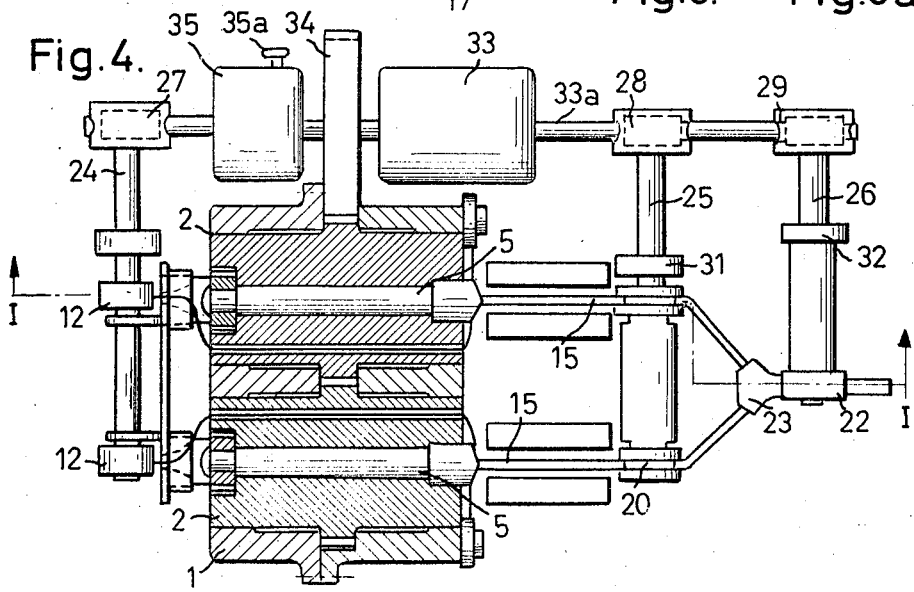
FIG. 4 shows the apparatus of FIG. 1 in plan section on line IV—IV.

A winding cylinder 2 is journaled in a stationary housing 1 for rotation about a horizontal axis. It is provided with an external gear rim 3 which meshes with a drive gear 34 and the gear rim 3 of the other winding cylinder 2 (FIG. 4). A passage 4 spaced from the axis of rotation extends in an axial direction through the cylinder 2.

The cylinder 2 rotatably receives a coaxial shaft or mandrel carrier 5 one end of which carries a spur gear 6 arranged in a central recess in an axial end face of the cylinder 2. A shaft 7 spaced from the cylinder axis and parallel thereto carries a planet pinion 8 having two sets of gear teeth arranged at the same pitch diameter as that of the spur gear 6 with which it meshes. The planet pinion 8 also meshes with a stationary sun gear 9 mounted on a bracket 10 which is an element of the supporting machine frame, not otherwise shown in detail. The pitch diameter of the sun gear 9 is equal to that of the planet pinion 8, whereby the mandrel carrier 5 is rotated relative to the cylinder 2 and held stationary relative to the machine frame during rotation of the cylinder 2.

The afore-mentioned drive gear 34 is mounted on the dual output shaft 33a of an electric motor 33. The shaft 33a carries worms which mesh with respective worm wheels 28, 29, and directly drives a transmission 35 whose speed may be varied continuously by means of a control knob 35a in a manner known in itself. The continuouslyvariable-speed transmission 35 drives a worm wheel 27 by means of a worm mounted on its output shaft.

A feed roll 11 is connected to the worm wheel 27 by a shaft 24 which is mounted on the bracket 10 and also drives a pressure roll 12 through a pair of meshed gears 30 of which only one is seen in the drawing. A thermoplastic wire is drawn from a freely rotating supply reel 14 on the machine frame through a wire guide 13 and through a central eye in the sun gear 9 by the cooperating rolls 11, 12 at a rate which can be precisely controlled by the knob 35a. The wire passes through the passage 4 and is fed without back tension to a resilient mandrel, 15 axially extending from the stationary shaft 5.

Figure 2:
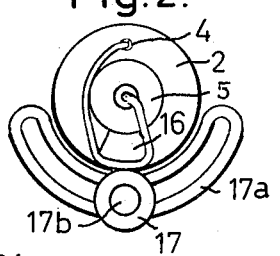
FIG. 2 illustrates a detail of the apparatus of FIG. 1 in front elevational section on the line II—II.

As better seen in FIG. 2, the wire leaving the passage 4 is compressed once during each revolution of the cylinder 2 between a coining die 16 mounted on the cylinder 2 and a backing roll 17 freely rotatable on the housing 1 about a pin 17b whose position on the housing 1 can be adjusted along a slotted bracket 17a in an arc about the cylinder axis. The die 16 forms an engaging head on each turn of the plastic wire spiral which will constitute an interlocking element of the ultimate slide fastener. The precise position of the head on the turn can be adjusted by moving the pin 17b along the bracket 17a.

Figure 3:
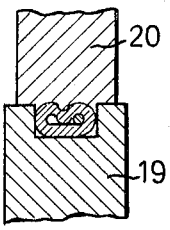
FIG. 3 shows another detail of the apparatus of FIG. 1 in front-elevational section on a larger scale and on line III—III.
Figure 3A:
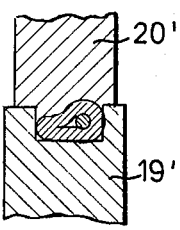
FIG. 3A illustrates a modification of the device of FIG. 3.

The coined wire is loosely wound on the mandrel 15 by the rotation of the cylinder 2 and is being drawn axially along the mandrel away from the cylinder 2, as will presently become apparent, whereby it is formed into a spiral on the mandrel. The spiral, while still supported on the mandrel, passes through a tubular electric heating element 18, not shown in detail. The hot and soft spiral is flattened between two cooperating shaping rolls 19, 20 whose circumferential faces are provided with cooperating grooves and projections as shown in FIG. 3. Modified rolls 19', 20' are shown in FIG. 3A. Whereas the rolls 19, 20 centrally compress each turn to produce fastener elements of the approximately symmetrical shape seen in FIG. 3, the rolls 19', 20' compress one end of the turn which is completely flattened, whereas the other end which includes the head (not seen) is kept expanded by the mandrel 15.

The mandrel 15 passes through the flattening die formed by the rolls to maintain a desired expanded shape in a portion of each spiral turn. The rolls 19, 20 (19', 20') are driven by a shaft 25 fastened to the afore-mentioned wormwheel 28 and through a pair of engaged spur gears 31 as explained above with reference to the rolls 11, 12.

A row of integrally connected slide fastener elements is discharged from the rolls 19, 20 associated with each winding mechanism and pulled through a conventional pull-up bracket 23 for interlocking engagement with the other row of slide fastener elements by a pair of pull rolls 21, 22 driven by the afore-mentioned worm wheel 29, a shaft 26, and a pair of meshing spur gears 32.

Figure 5:
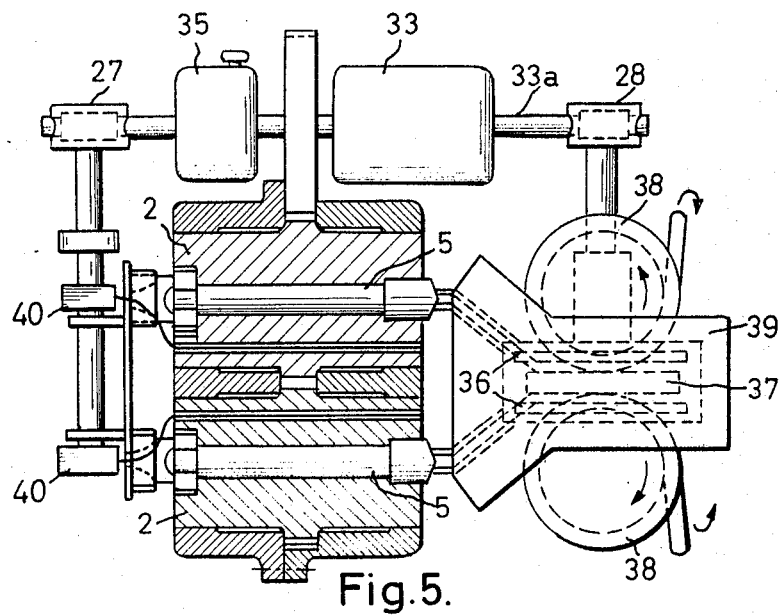
FIG. 5 shows another apparatus for performing the method of the invention in a view corresponding to FIG. 4.

The modified embodiment of the invention shown in FIG. 5 is identical with that seen in FIG. 4 except for the features more specifically described hereinafter.

The shafts or mandrel carriers 5 are held stationary by mandrels 36 fixedly attached to respective carriers, converging in the general direction of wire movement and supported on a toothed shaping wheel 37 as will be described with reference to FIG. 7. The wheel 37 and two cooperating shaping wheels 38 are partly enveloped by a heating jacket 39 which also envelopes portions of the mandrels 36 and of the wire spirals supported thereon between the two cylinders 2 and the shaping station formed by the wheels 37, 38. It will be understood that the shaped spirals discharged from the station 37, 38 constitute rows of integrally connected slide fastener elements which are pulled up and drawn off in a manner evident from FIGS. 1 and 4, but not shown in FIG. 5.

Figure 6:
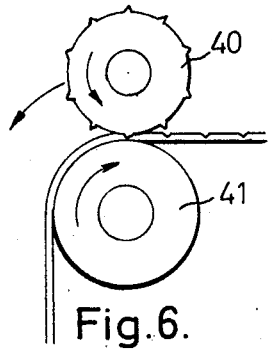
FIG. 6 shows a detail of the apparatus of FIG. 5 in side elevation on a larger scale.

The engaging heads on the fastener elements made on the apparatus of FIG. 5 are shaped between a smooth roll 41 and a spacedly toothed roll 40, as seen in FIG. 6, which form notches in the wire fed to each cylinder 2 in FIG. 5 and are driven by the worm wheel 27. The rolls 40, 41 also control the feed rate of wire to the cylinders 2 as set by the transmission 35. The notches in the wires are formed at distances corresponding to one spiral turn, and their position can be adjusted by angularly shifting the roll 40 on its drive shaft in an obvious manner, not illustrated in detail.

Figure 7:
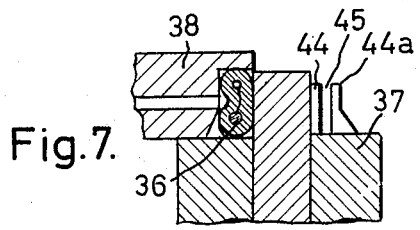
FIG. 7 illustrates another detail of the apparatus of FIG. 6.

As seen in more detail in FIG. 7, the wheel 37 has three axial portions of which the central portion has a somewhat greater diameter than the terminal portions. Two rows of teeth 44, 44a on the cylindrical face of each of the terminal roll portions define therebetween a radially open and circumferentially continuous annular slot 45 which receives a respective mandrel 36, only one of the mandrels being seen in FIG. 7 for the sake of clarity. Each axial gap between circumferentially consecutive pairs of teeth 44, 44a receives one turn of a wire spiral which is being deformed on the wheel 37 by the axial pressure of an associated wheel 38. Pins 38a radially projecting from each wheel 38 engage the spiral turns while they are confined between the wheels 37, 38 and give them the desired flat shape. The wheel 37 is driven by the worm wheel 28.

Figure 8:
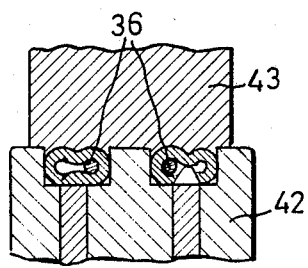
FIG. 8 illustrates a variation of the detail of FIG. 7.

FIG. 8 shows a modification of the device illustrated in FIG. 7 in which the wheels 37, 38 are replaced by a pair of rolls 42, 43 having two grooves or projections each for receiving both strands of wire spirals discharged from the two winding mechanisms. It will be understood that the rolls 42, 43 are driven by the worm wheel 28 in the manner described with reference to the rolls 19, 20 and FIGS. 1 and 3.

In operating the devices illustrated in FIGS. 1 and 4 or 5, a resilient thermoplastic wire mainly consisting of synthetic resin, such as nylon, is pushed by the rolls 11, 12 or 40, 41 into the winding mechanisms at a rate which is at least several times the rotary speed of the cylinder 2 times the circumference of the associated mandrel 15 or 36, or in other words the circumferential speed of the mandrel 15, 36 relative to the cylinder 2. As a consequence, the spiral turns of the wires are loose on the associated mandrels. In the examples of the invention illustrated in FIGS. 3, 3A, 7 and 8, the internal circumference of each wire turn is more than twice, and close to three times the external circumference of the associated mandrel.

It will be appreciated that the desired configuration of the wire turns on the mandrels cannot be achieved in the precisely reproducible manner necessary for the manufacture of slide fastener elements without the avoidance of all back tension on the wire in the spiral forming zone which is inherent in the apparatus illustrated when the speed of the transmission 35 is properly controlled.

Because the performance of the machine of the invention is precisely predictable after a few tests, the spacing of the interlocking heads on the wire may be fixedly set by the selection of a shaping roll 40 in the apparatus of FIG. 5, and proper operation be maintained by adjusting the transmission 35 as needed to keep the interlocking heads in the desired position in which they are supported by the mandrels 15, 36 during flattening of the spirals.

The temperature of the heating devices 15 is not particularly critical, but should be selected to release any internal stresses generated in coiling the wire spiral and making the wire soft enough for roll shaping. Longitudinal stretching of the wire does not have to be guarded against in the absence of significant longitudinal stresses in the wire while hot.

The wire spirals should be well below their softening temperature when they reach the pull-up bracket 23 where they may be stressed relatively severely. Further processing of the pulled-up spirals may be conventional, and is not in itself relevant to this invention.

The apparatus illustrated is capable of operating at high rotary speeds of the cylinders 2 without causing undesired deformation of the fastener elements by tension in the winding operation. The spools 14 may be quite heavy without interfering with the quality of the product. Spools originally holding 5 to 10 kilograms of fine round nylon wire of the type commonly used for dress fasteners and the like may be directly placed on the machine, and permit long uninterrupted runs.

What is claimed is:
1. A method of making a continuous row of slide fastener elements which comprises:
   (a) longitudinally feeding a thermoplastic wire to a winding zone at a predetermined feeding rate;
   (b) winding the wire in said zone about the axis of a mandrel at such a winding rate that the turns of the wound wire have an internal circumference which is at least twice the outer circumference of said mandrel in said zone;
   (c) axially moving said turns along said mandrel;
   (d) heating said turns to a temperature above the softening temperature thereof for a period sufficient to release the internal winding stresses; and
   (e) laterally compressing the heated turns.
2. A method as set forth in claim 1, wherein said wire is cyclically compressed in a transverse direction until deformed while being fed to said mandrel.
3. A method as set forth in claim 2, wherein another thermoplastic wire is fed longitudinally to another winding zone at a certain feeding rate, wound in said other zone about the axis of another mandrel at such a winding speed that the turns of the other wound wire have an internal circumference which is at least twice the outer circumference of said other mandrel, the turns are moved axially along said other mandrel, the last mentioned turns are heated to a temperature above the softening temperature thereof for a period sufficient to release the internal winding stresses, and said heated turns are laterally compressed, said other wire being cyclically compressed in a transverse direction until deformed while being fed to said mandrel, the deformed portions occurring in each turn of said first mentioned wire and of said other wire; and wherein said laterally compressed turns of said first-mentioned wire and of said other wire are cooled below the softening temperatures thereof, and pulled up with each other.
4. A method as set forth in claim 1, wherein said wire is fed to said zone at said feeding rate by pushing the wire into said zone.

References Cited

UNITED STATES PATENTS

| 2,796,631 | 6/1957 | Stegmann | 264—281 |
| 3,121,256 | 2/1964 | Fleisher | 18—19 |
| 3,137,036 | 6/1964 | Bashover | 264—281 |
| 3,170,014 | 2/1965 | Burbank | 264—281 |
| 3,196,489 | 7/1965 | Chery | 18—19 |
| 3,337,672 | 8/1967 | Steingrubner | 264—281 |

ROBERT F. WHITE, *Primary Examiner.*

R. R. KUCIA, *Assistant Examiner.*

U.S. Cl. X.R.

264—285